Oct. 8, 1957 V. H. HILDEBRANT 2,808,860
POWER ACTUATED WHEEL SUPPORTING AND CLAMPING APPARATUS
Filed Oct. 26, 1953 4 Sheets-Sheet 4

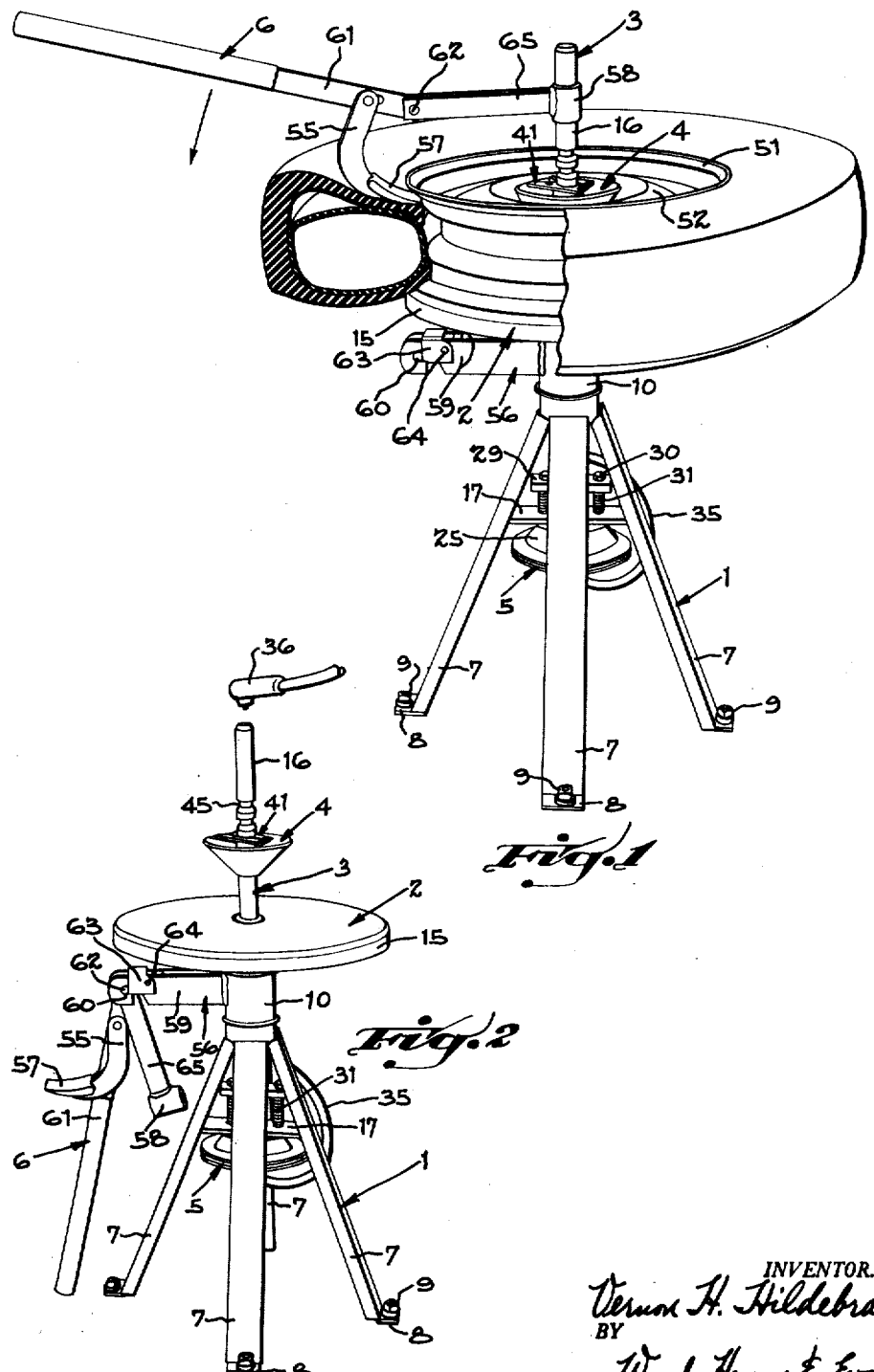

INVENTOR.
Vernon H. Hildebrant.
BY
Wood, Herron & Evans.
ATTORNEYS.

United States Patent Office 2,808,860
Patented Oct. 8, 1957

2,808,860

POWER ACTUATED WHEEL SUPPORTING AND CLAMPING APPARATUS

Vernon H. Hildebrant, Morrow, Ohio

Application October 26, 1953, Serial No. 388,149

5 Claims. (Cl. 144—288)

This invention relates to an improved apparatus for supporting a vehicle wheel against movement while the pneumatic tire is being demounted from the wheel or is being placed upon it. The invention is directed particularly to a power operated machine for clamping the wheel rigidly during the mounting of a tire casing upon it; also for clamping the wheel during the separating or "breaking" of the bead of the tire from the rim preparatory to stripping a tire casing from the rim.

Various mechanical tire mounting devices heretofore have been proposed in which a vehicle wheel is held firmly against movement during tire mounting or demounting operations; however, such machines have embodied manually operated clamps which require time and effort to operate and which are lacking in power. In some tire changing operations, as for example in the dislodging of the bead of a tire from a wheel rim to which the bead has become virtually welded or vulcanized during use, substantial pressures need to be exerted on the tire casing. Therefore, any slippage of the wheel at such a time, through imperfect clamping of the wheel, may result in serious injury to the operator.

The principal objective of this invention has been to provide a simple, inexpensive clamping mechanism in which powerful clamping pressure rapidly may be exerted by means of a pressure fluid, such as the compressed air, which is conveniently available at the usual filling station where tire changing apparatus is employed. A further objective of the invention has been to provide a power operated clamp, which for its effectiveness and reliability is not dependent upon the exercise of careful attention by the workman utilizing the equipment. A still further objective of the invention has been to provide an improved clamping mechanism which is manipulated rapidly and conveniently and which, through its simplicity, is considerably less expensive to construct than the clamping mechanisms heretofore available.

In a typical tire demounting operation, the wheel is held securely and a bead breaking tool is utilized to separate the beads of the tire from the respective portions of the rim with which the beads are associated, then the casing is stripped from the rim. Sometimes these operations are performed without changing the position of the wheel, but sometimes it is necessary to break the bead at one side of the tire, then to flop the wheel over to permit the bead at the other side to be broken before the casing is stripped from the rim. In tire mounting operations, a tool is utilized to pry or force the tire beads over the rim, this movement usually being accomplished by circumferential movement. The present invention is disclosed in relation to tire handling apparatus of the type shown in Henderson United States Patents Nos. 2,609,038 and 2,609,039, which were issued September 2, 1952, but it will be understood that various types of bead breaking and tire removing tools, and also tire mounting tools, other than those shown in the aforesaid Henderson patents may be utilized.

Various features and advantages of the present tire handling apparatus are disclosed in greater detail in the following specification in conjunction with the accompanying drawings in which:

Figure 1 is a perspective view showing the apparatus in use during a bead breaking operation, the tire being shown partly in cross section.

Figure 2 is a perspective view of the apparatus, the parts being shown in position prior to the breaking of the lower bead of a tire.

Figure 3:
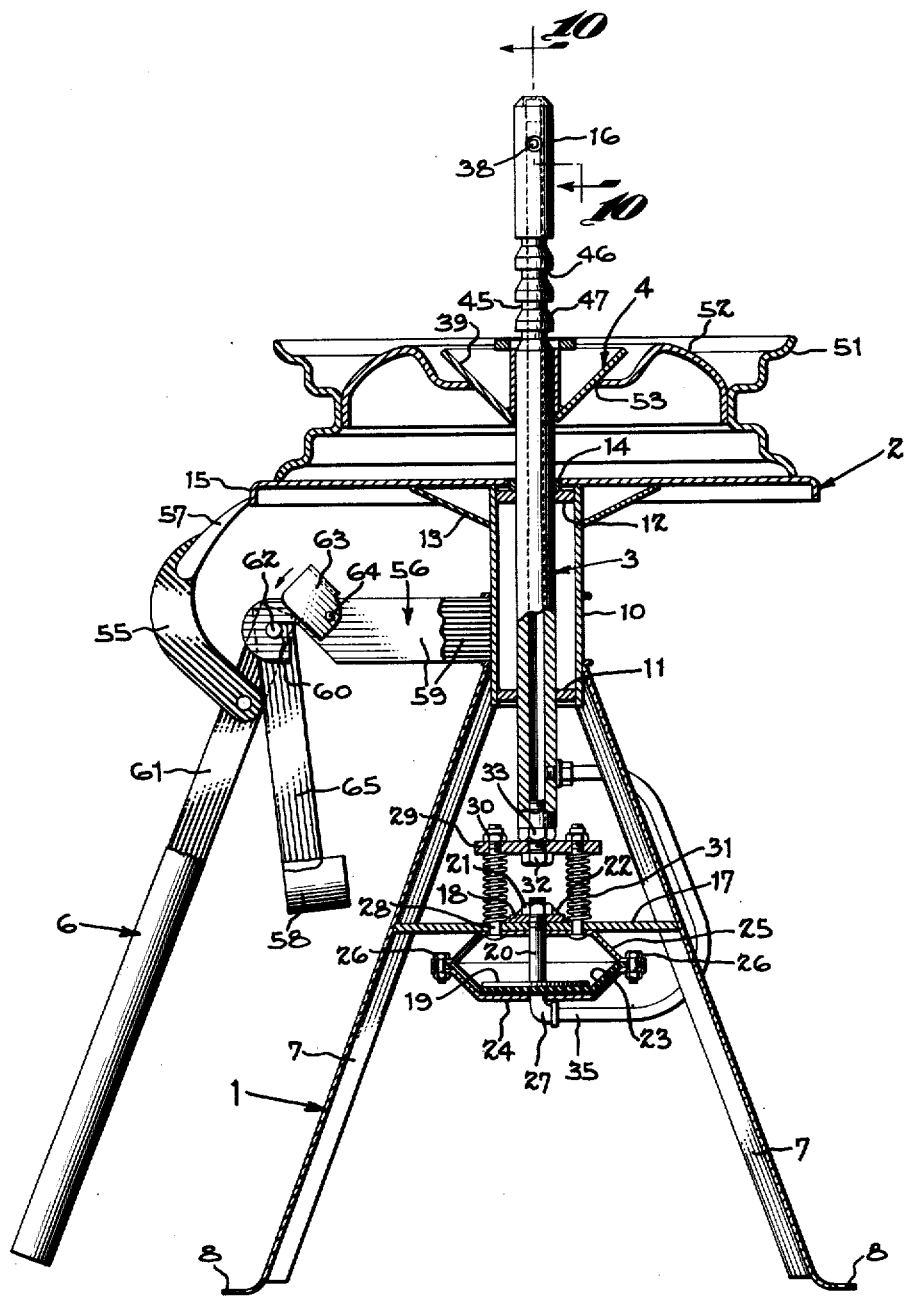
Figure 3 is a sectional elevation showing the relative location of the parts prior to exertion of clamping pressure.

The apparatus illustrated in the drawings (Figures 1 and 2) consists essentially of a pedestal indicated generally at 1, a table or support member 2, a post 3, a clamp 4, which is removably associated with the post, power clamping means indicated generally at 5, and a bead breaking assembly indicated generally at 6.

Figure 4:
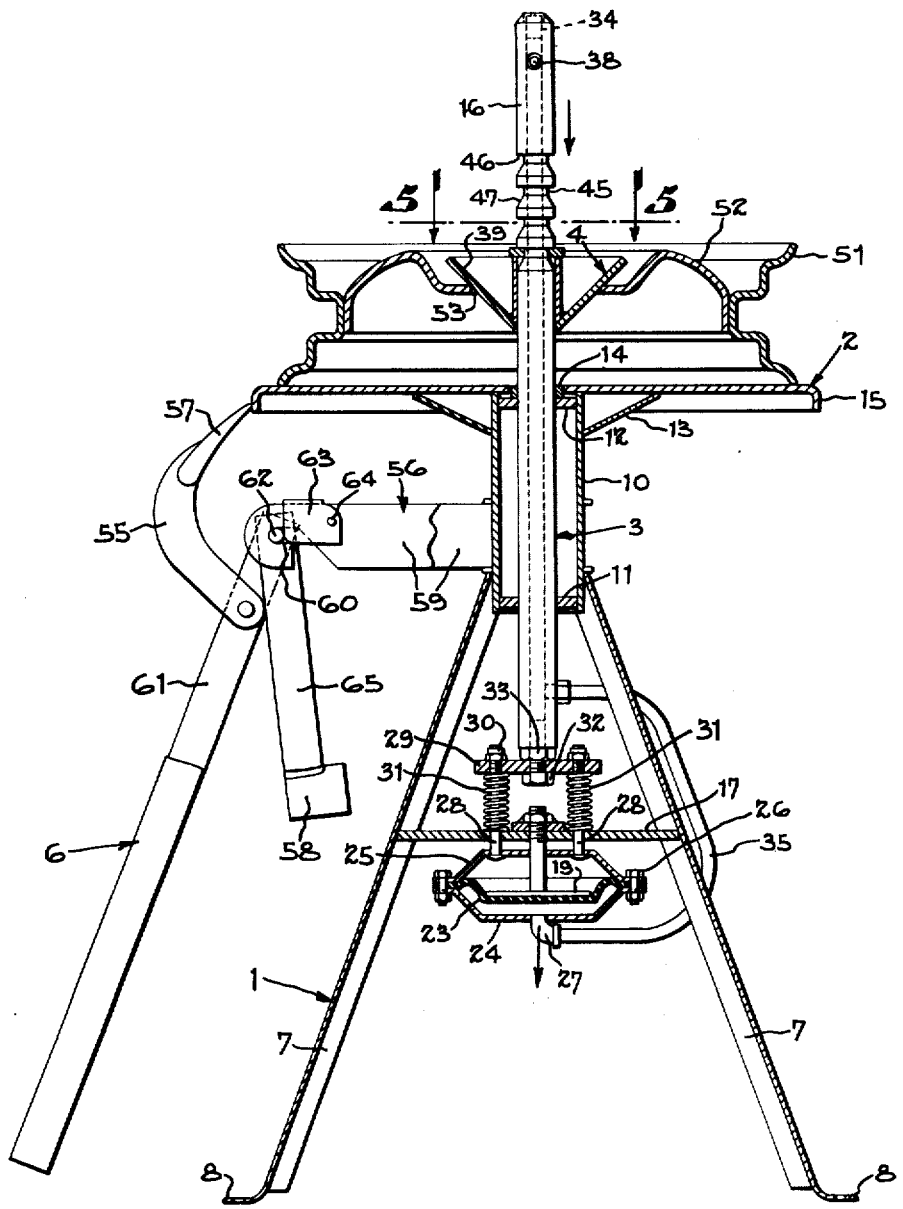
Figure 4 is a sectional elevation similar to Figure 3, showing the relationship of the parts during exertion of clamping pressure.

The pedestal 1 of the structure furnishes a support by which the table 2 is mounted rigidly at a convenient level above the floor and it also furnishes a standard or frame on which the other parts of the machine are mounted. In the construction shown, the pedestal consists of rigid legs 7 which may be of angle or channel shape in cross section and which are provided with feet 8 through which the pedestal may be bolted to a floor by means of bolts 9. The pedestal preferably is of pyramid form, the upper end of the legs 7 being welded to a cylindrical column 10, as shown in Figure 4. The column 10 is provided with end plates or plugs 11 and 12 at opposite ends, the plug at the upper end of the column being spaced inwardly a short distance from the end of the column as is shown. The end plates 11 and 12 are welded or otherwise suitably fastened to the column 10 and they are bored to receive the post 3 in slidable relationship for longitudinal movement of the post.

The table 2 constitutes a support against which a vehicle wheel is clamped while its tire is being mounted or demounted, the wheel being confined under pressure between the table and the clamp 4, which is secured to the post 3 as explained in detail later. The table therefore, is fastened rigidly to the upper end of the column 10 and is also preferably braced by a gusset member 13 which may be in the form of an inverted cone having its base welded to the bottom of the table 2 and its apex welded to the column 10. The table contains a central bore which is generally in alignment with the bores in the end plates 11 and 12 but which is sufficiently large to permit a felt washer 14 to be placed around the post 3 within the recess provided by the inward spacing of the end plate 12 from the top of the column 10. The felt washer is saturated with oil to provide lubrication for the post 3 during longitudinal movement thereof.

In the preferred construction, the table 2 is of circular form and its outer periphery is provided with a downturned flange 15, the diameter of the table being slightly greater than the diameter across the rim of the largest wheel which the machine is intended to accommodate. In such an arrangement, the face of the table furnishes the support for the wheel rim during clamping, while the flange 15 and adjacent table edge, provide guiding surfaces for cooperating with the bead breaker 6 as explained later.

The upper portion of the post 3 projecting above the table, as indicated at 16 in Figures 1 and 2, has clamp element 4 associated with it while the power actuator 5 is associated with the post below the table. In accordance with this invention, an actuator of simple, inexpensive construction is furnished by utilizing a power cylinder which is connected to the post and which cooperates with a "piston" element which is fixed against movement by connection to the pedestal. The power motor may be of the sliding piston type but preferably is of the diaphragm type, since the latter eliminates the need for packings or rings.

Specifically, described with reference to Figures 3 and 4, a cross brace 17 is welded to opposed legs 7 of the pedestal at a suitable level above the floor. A second cross brace 18, placed above or below the first and extending at right angles to the first, may also be welded to the other two opposed legs of the pedestal for additional stiffness. The "piston" or reaction member of the power motor consists of a disc 19 which is of substantial diameter and which is fastened to a rod 20 which, at its other end, is fastened to the cross braces 17 and 18 so as to be immovable. For example, in the construction shown, the rod 20 has a threaded end which carries a nut 21; the nut is secured to cross brace 18 by welding as at 22, and the rod may also be tack-welded to the nut after assembly.

The power cylinder comprises a diaphragm 23 formed of rubber or other elastic material having its marginal edge clamped between opposed casing members 24 and 25, the casing members and diaphragm being held together by a series of bolts 26 at the peripheral flanges of the assembly. Both casing members are dished and the piston disc 19 is seated upon the upper surface of the diaphragm. Therefore, the admission of fluid under pressure, as through inlet 27 into the chamber between the diaphragm and the lower casing 24, (Figure 4) will cause downward movement of the cylinder assembly with respect to the fixed piston disc 19.

The upper casing 25 is bored to receive a pair of connector bolts 28—28 which also pass through clearance bores in the cross brace 17. The heads of the bolts 28 are located interiorly of the upper casing 25 while the upper end portions of the bolts pass through a cross piece 29, and include nuts 30 engaging the top surface of the cross piece. Compression springs 31—31 are disposed around the bolts 28 respectively, the springs having their upper ends seated against the cross piece 29 and their lower ends seated against the cross brace 17. The post 3 of the apparatus is suitably connected to the cross piece 29, for example, in the construction shown, the lower end of the post is bored and threaded to receive a bolt 32 which passes through a bore in the cross piece 29 intermediate bolts 28 thereof. A lock nut 33 is interposed between the end of the post and the cross piece 29 to hold these parts in rigid assembly.

From this construction it will be seen that the admission of pressure fluid into the space between the lower casing 24 and the diaphragm, causes the power cylinder to move downwardly with respect to the fixed piston (Figure 4), thereby pulling the bolts 28 downwardly against the bias of the springs 31. Cross piece 29, which is anchored to the bolts 28, is thereby caused to move downwardly and it carries the post 3 with it.

Any suitable pressure fluid source may be employed to operate the apparatus and the pressure fluid may be admitted in any suitable manner. However, most filling stations wherein tire changing operations are conducted, are equipped with a compressed air system, and the present apparatus has been particularly constructed to facilitate the application of air at a convenient level from the ordinary air chuck at the end of an air hose. This is accomplished by utilizing the post itself as a conduit for transmitting compressed air from a convenient level at the top of the post to the power motor apparatus below the table.

Figure 10:
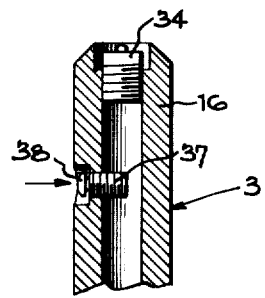
Figure 10 is a fragmentary sectional elevation taken on the line 10—10 of Figure 3, detailing the operating valves of the clamping post.

For this purpose, the post 3 is of tubular construction and its upper end is bored and threaded to receive an air check valve 34 of the conventional "Gill" or "Shrader" type (Figure 10). The lower end of the post, of course, is plugged by bolt 32, but a flexible hose 35 is used for interconnection with the power motor (Figure 3), one end of the hose being threaded into the post at a level above the bolt 32 for communication with the post bore, while the other end of the hose is threaded to the inlet elbow 27. As shown in Figure 10, the admission valve 34 is located within a counterbore sufficiently large to receive a conventional air nozzle, indicated at 36 in Figure 2; the counterbore protecting the valve against injury when a wheel is being placed over the post.

To release air from the system and thereby relax clamping pressure, a simple, hand operated poppet valve 37 is placed in communication with the post bore preferably at a sidewise portion of the post just below its upper end (Figure 10). The poppet valve like the admission valve, preferably is located in a counterbore so that its head 38 does not project beyond the post periphery. By pressing inwardly upon the head of the poppet valve, compressed air is permitted to escape from the power cylinder up through the post bore, and the compression springs 31 thereby cause the post and power cylinder to be lifted to unclamped position.

The clamp member 4, which is utilized to exert the clamping pressure of the post upon an automotive wheel resting upon table 2, embodies a composite cone element 39 and sleeve element 40 which are welded together (Figures 5 to 9). The sleeve is bored to fit over the post 3 freely while the cone is dimensioned to seat against the hub openings of various diameter in the various styles or types of wheels which the apparatus is intended to accommodate. Inasmuch as the post, in the preferred construction, projects centrally from the table, the cone member serves to center a wheel upon the table in a position concentric to the post.

Opposed jaw members 41—41 are pivotally connected to the clamp member 4 to lock it to the post. For this purpose, a jaw mounting plate 42 is welded in a position extending laterally across the space between the outer edge of the cone and the end of the sleeve member. Jaws 41 are pivotally mounted upon pivot pins 43—43 which project upwardly from the mounting plate 42. The jaws are configurated to provide generally semicircular opposed mouth portions 44 to engage one of a series of annular recesses or grooves 45, formed in the post in spaced relationship to one another longitudinally. Each recess provides an annular abutment surface or shoulder 46 facing toward the table and engageable by the mouth portions of the jaws. Preferably, each recess 45 of the post includes a conical portion 47 which diverge downwardly and outwardly from the downwardly facing shoulder 46. The conical portions provide a ratchet action with respect to the clamp jaws, allowing the clamp to slide down the post by its own weight to an elevation suitable to engage a wheel resting upon the table, as explained in detail later.

Figure 5:
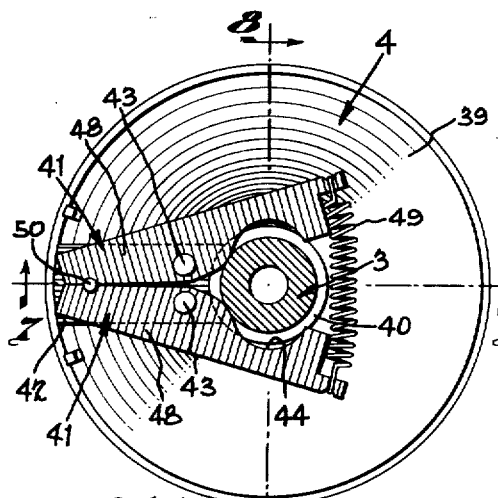
Figure 5 is a plan view taken on the line 5—5 of Figure 4, showing the clamp member in disengaged position.
Figure 6:
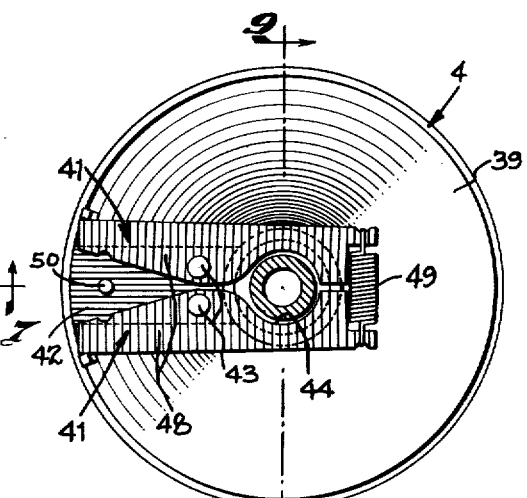
Figure 6 is a view similar to Figure 5, showing the clamp member in its engaged position.
Figure 7:
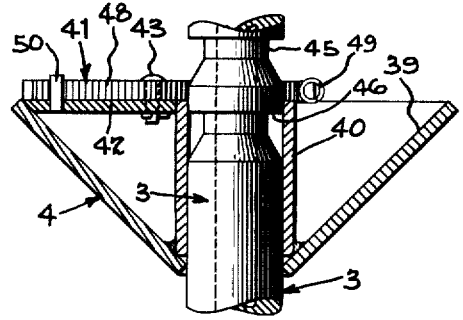
Figure 7 is a sectional elevation taken on the line 7—7 of Figure 5, further illustrating the clamp structure in disengaged position.
Figure 8:
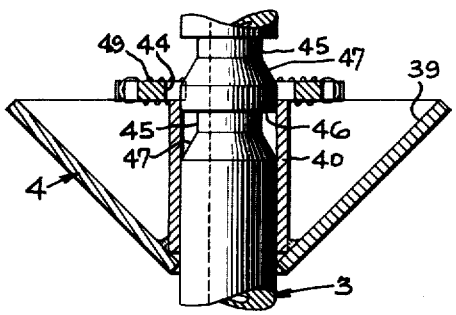
Figure 8 is a sectional elevation taken on the line 8—8 of Figure 5.
Figure 9:
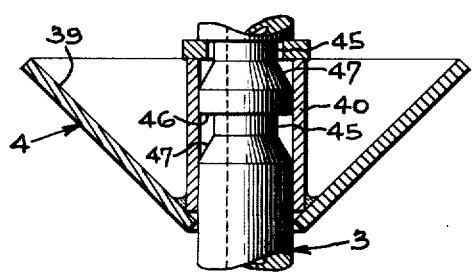
Figure 9 is a sectional elevation taken on the line 9—9 of Figure 6 illustrating the clamp structure in engaged position.

As best shown in Figures 5 and 6, the jaws include lateral shanks 48 projecting outwardly beyond the pivot pins 43 whch are squeezed together to open the mouth of the jaw. The jaws are normally urged toward closed position by the tension spring 49 connecting the mouth portions to one another. When squeezed to open position, the shanks engage a centering pin 50 which centers the open mouth relative to the post. It will be noted that the width of the mounting plate 42, as viewed from above in Figure 6, is less than the width of the shanks for convenience in grasping the shanks between the fingers.

In clamping a wheel 51 to the table, the disc portion 52 of the wheel, which includes the central hub opening 53, is placed over the post with the clamp member 4 removed from the post. The sleeve 40 of the clamp member is then slipped upon the post and pushed downwardly until the cone 39 enters the hub opening 53; then, if necessary, the wheel may be shifted laterally to a generally concentric position relative to the post. It will be understood that the wheels come in various sizes and types of construction that the diameter and elevation of the hub opening will vary from one type of wheel to another. However, by virtue of the multiple grooves 45, the clamp finds its own elevation and its spring loaded, yieldable jaws cam over the conical portions 47 and snap into the grooves 45 successively as the clamp slides downwardly toward the wheel. When the cone 39 enters the hub opening 53, the jaws may be gripping the conical portion 47 or they may be fully engaged in the groove 45, as shown in Figure 4. In either event fluid pressure is applied to the cylinder causing the post to move downwardly, bringing the adjacent shoulder into engagement with the jaws to force the cone into clamping engagement. If the wheel is off center, then the cone surface is effective to cam the wheel to a concentric position as it moves down into the hub opening. Although the degree of post movement necessary to effect the clamping pressure is slight, sufficient lineal movement is provided by the power cylinder to take up the clearance which may exist between the jaws and abutment surface and to center the wheel.

After the tire is mounted or dismounted, the wheel is quickly unclamped for removal by manually depressing the head 38 of the air release valve 37 to allow the post to rise as shown in Figure 3. The clamp 4 is then disengaged by squeezing the shanks 48 of the clamping jaws to shift them to the position shown in Figure 5 into engagement with the centering pin 50. This completely disengages the mouth portions of the jaws from the annular groove and allows the clamp to be slipped upwardly from the post and removed from it.

When the machine is used to demount a tire, a bead breaker is utilized which is generally similar to the structure disclosed in the aforesaid Henderson patents. The bead breaker of the present structure, which is indicated generally at 56 in Figure 3, includes a single breaker jaw 55 which is utilized in breaking both the lower and upper beads as distinguished from the double jaw arrangement disclosed in the prior Henderson patents. In the present structure, the single bead breaker assumes two positions, one for the lower bead and the other for the upper bead. In the first position (Figure 3), the breaker is pivotably mounted upon a bracket 56 attached to the column; in the second position (Figure 1), the breaker is mounted upon the upper end portion 16 of the post. When the breaker is positioned to engage the lower bead as shown in Figure 3, the beak 57 of its jaw engages the table flange 15 which acts as a guide surface for the upward movement moving breaker until the beak comes into contact with the side wall of the tire and against the bead. In its position upon the post, the breaker, which includes a sleeve 58 loosely embracing the post, provides a cant lock engagement upon the post to resist the upward force as the bead is forced downwardly by lever action.

Described in detail with reference to Figure 3, the bracket 56 comprises a pair of spaced bars 59—59 having generally hook shaped outer ends delineating a slot 60. The end of a breaker lever 51 is confined between the bars and the end of the lever includes a pivot pin 62 extending outwardly on opposite sides which engages the slot 60. A latch 63, generally of U-shaped configuration, overlies the opposites of the bracket bars and is pivoted to them as at 64. The latch normally resides in a downward position with its outer edges engaging the pivot pin (Figure 2) to lock the pin and its lever in the slot. In this position the pin 62 provides a fulcrum point for the lever in actuating the breaker for the lower bead. It is to be noted that a second lever arm 65 is pivotally connected by the pivot pin 62 to the end of the first lever. Lever arm 65 consists of a pair of spaced bars overlying opposite sides of lever 61. It is utilized to anchor the breaker to the post in breaking the upper bead and is inoperative while the lower bead is being broken.

After the lower bead is broken loose, latch 63 is swung up to the position shown in Figure 3, allowing the pivot pin 62 to be disengaged from its slot. The breaker assembly is now mounted upon the post in position to break the upper bead as shown in Figure 1. The sleeve 58, which is welded to the free end of lever arm 65, provides a loose fit upon the post. When the lever sections are straightened to the position shown in Figure 1 and lever 61 forced downwardly, the upward reacting force is transmitted through pivot pin 62, tending to swing lever arm 65 upwardly. The upward force cants the sleeve and this provides a binding engagement with the post so that the breaker assembly is firmly locked upon the post against displacement.

After the upper bead is loosened, the bead breaker is removed from the post and replaced with a tire removing tool. This tool does not form an essential part of the present invention and is not disclosed in the drawings. In general it comprises a lever arranged to be pivoted from the post and a bead stripping member attached to the lever and effective to progressively pry the bead from the rim as the lever is rotated to advance the stripping member around the circumference of the rim.

When the machine is utilized to mount a tire, the wheel is clamped in position upon the table and the tire is placed upon it; thereafter a tire mounting tool is pivotally mounted upon the post. This tool likewise does not form an essential part of the present invention and has been omitted from the disclosure. In general, the mounting tool includes a lever having a shoe member effective to slide the bead of the tire over the rim of the wheel as the shoe is moved around the circumference of the rim similar to the demounting tool. The two beads are naturally applied from the same side of the wheel, and the bead prying operation being repeated for each bead.

From the foregoing it will be understood that the present machine provides a self-adjusting clamping action with respect to the various types of vehicle wheels for which it is intended. The wheel clamping and unclamping operations, by virtue of the adjustable clamp member and power cylinder, are executed rapidly and with practically no physical effort. Normally the clamping operation represents a substantial part of the work involved in mounting and demounting the tires; consequently, the present machine greatly reduces the time and effort and also promotes safety by virtue of its firm, reliable clamping action.

Having described my invention, I claim:

1. Apparatus for holding a wheel while a tire is being mounted thereon or demounted therefrom, said apparatus comprising a frame having a cross member connected rigidly thereto, a table mounted at the top of said frame, the said table being dimensioned to receive and support a wheel, a post reciprocably extending through a central portion of said table, clamp means removably engageable with said post at the one side of said table for effecting clamping engagement with a wheel mounted on said table upon movement of said post toward said table, and a diaphragm type power motor for operating said post, the said power motor comprising a flexible diaphragm, a movable casing in pressure-tight connection with said diaphragm, means extending from said cross member for supporting the central portion of said diaphragm against movement, means rigidly interconnecting the casing of said power motor with said post, and means for directing pressure fluid between the diaphragm and casing whereby movement of said casing effects movement of said post toward said table.

2. Apparatus for holding a wheel while a tire is being mounted thereon or demounted therefrom, said apparatus comprising a frame presenting a table dimensioned to receive and support a wheel, the said frame having a rigid member constituting a support, a post located at one side of said rigid member, the said post reciprocably extending through said table, the projecting portion of said post having clamp means associated therewith for cooperation with said table, a diaphragm type power motor located at the other side of said rigid member and comprising a reciprocally movable casing, a diaphragm in pressure-tight connection with said casing, means extending from said rigid member for restraining the central portion of said diaphragm against movement toward said rigid member, rigid means slidably journalled by said rigid member and interconnecting the post with the casing of said power motor, spring means interposed between the rigid member and said post normally biasing said post away from said rigid member to thereby move the projecting portion of the post to an unclamping position with respect to the table, means for directing pressure fluid into the casing for reaction against the diaphragm whereby to effect clamping movement of the post through movement of the casing, and manually operated means for controlling admission of pressure fluid to the casing and release of pressure fluid therefrom.

3. Apparatus for holding a wheel while a tire is being mounted thereon or demounted therefrom, said apparatus comprising a frame presenting a table dimensioned to receive and support a wheel, the said frame having a rigid member constituting a support, a post located at one side of said rigid member, the said post reciprocably extending through said table, the projecting portion of said post having clamp means associated therewith, a diaphragm type power motor located at the other side of said support and comprising a reciprocally movable casing, a diaphragm in pressure-tight connection with said casing, means extending from said support for restraining the central portion of said diaphragm against movement toward said support, movable means interconnecting the said post with the casing of said power motor, means for directing pressure fluid into casing for reaction against the diaphragm whereby to effect clamping movement of the post through movement of the casing, manually operated means for controlling admission of pressure fluid to the casing and release of pressure fluid therefrom, and spring means interconnecting said casing with said rigid member for effecting movement of said post in unclamping direction with respect to said table upon release of pressure fluid from said casing.

4. Apparatus for holding a wheel while a tire is being mounted thereon or demounted therefrom, said apparatus comprising a frame, a table mounted at the top of said frame, said table being dimensioned to receive and support a wheel, a cross member rigidly connected to said frame below said table, a vertical post reciprocably mounted in the frame and projecting upwardly through the center of the table, clamp means removably engageable with said post above the table for effecting clamping engagement with a wheel mounted on said table upon downward movement of said post, a diaphragm type power motor for operating said post, said power motor disposed below said cross piece and comprising a flexible diaphragm, a movable casing in fluid tight pressure connection with said diaphragm, a piston rod fixed to and extending downwardly from the cross piece and into the casing in axial alignment with said post, a piston disk fixed to the lower end of the piston rod inside of the casing for restraining the central portion of the diaphragm against upward movement toward said cross piece, connectors paralleling said piston rod and interconnecting the casing with the lower end of said post, and means to direct fluid pressure into the casing below the flexible diaphragm to pull said post down for clamping engagement with a wheel mounted upon the table.

5. Apparatus for holding a wheel while a tire is being mounted thereon or demounted therefrom as set forth in claim 4 in which the connectors extend through the cross member toward the post, and spring means associated with said connectors interposed between the lower end of the post and the cross member to bias said post toward the elevated position with respect to the table.

References Cited in the file of this patent

UNITED STATES PATENTS

| | | |
|---|---|---|
| 376,191 | George | Jan. 10, 1888 |
| 721,613 | Smith | Feb. 24, 1903 |
| 1,069,824 | Smith | Aug. 12, 1913 |
| 1,295,471 | Fleury | Feb. 25, 1919 |
| 1,793,864 | Manley | Feb. 24, 1931 |
| 2,057,200 | McCarthy | Oct. 13, 1936 |
| 2,065,644 | Bristol | Dec. 29, 1936 |
| 2,362,061 | Ewing | Nov. 7, 1944 |
| 2,416,195 | Mitchell | Feb. 18, 1947 |

UNITED STATES PATENT OFFICE
CERTIFICATE OF CORRECTION

Patent No. 2,808,860            October 8, 1957

Vernon H. Hildebrant

It is hereby certified that error appears in the above numbered patent requiring correction and that the said Letters Patent should read as corrected below.

In the grant, lines 1, 2 and 3, for "Vernon H. Hildebrant, of Morrow, Ohio" read --Vernon H. Hildebrant, of Morrow, Ohio, assignor, by mesne assignments, to Robert D. Henderson, of Wyoming, Ohio--; line 12, for "Vernon H. Hildebrant, his heirs" read --Robert D. Henderson, his heirs--; in the heading to the printed specification, line 4, for "Vernon H. Hildebrant, Morrow, Ohio" read --Vernon H. Hildebrant, Morrow, Ohio, assignor, by mesne assignments, to Robert D. Henderson, Wyoming, Ohio--.

Signed and sealed this 11th day of February 1958.

(SEAL)
Attest:
KARL H. AXLINE

Attesting Officer

ROBERT C. WATSON
Commissioner of Patents